Figure 1:
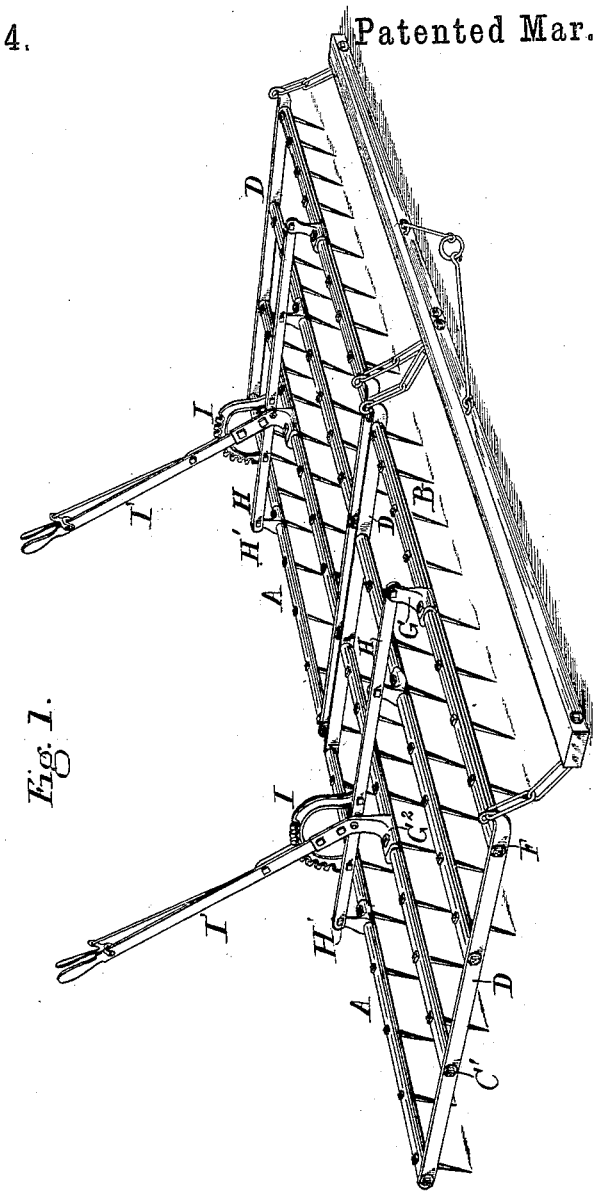

(No Model.) 2 Sheets—Sheet 1.

S. B. HENDRICKS.
HARROW.

No. 399,614. Patented Mar. 12, 1889.

Witnesses:
F. S. Regan,
E. T. Dowling.

Inventor:
Simson B. Hendricks,
per L. L. Morrison,
Attorney.

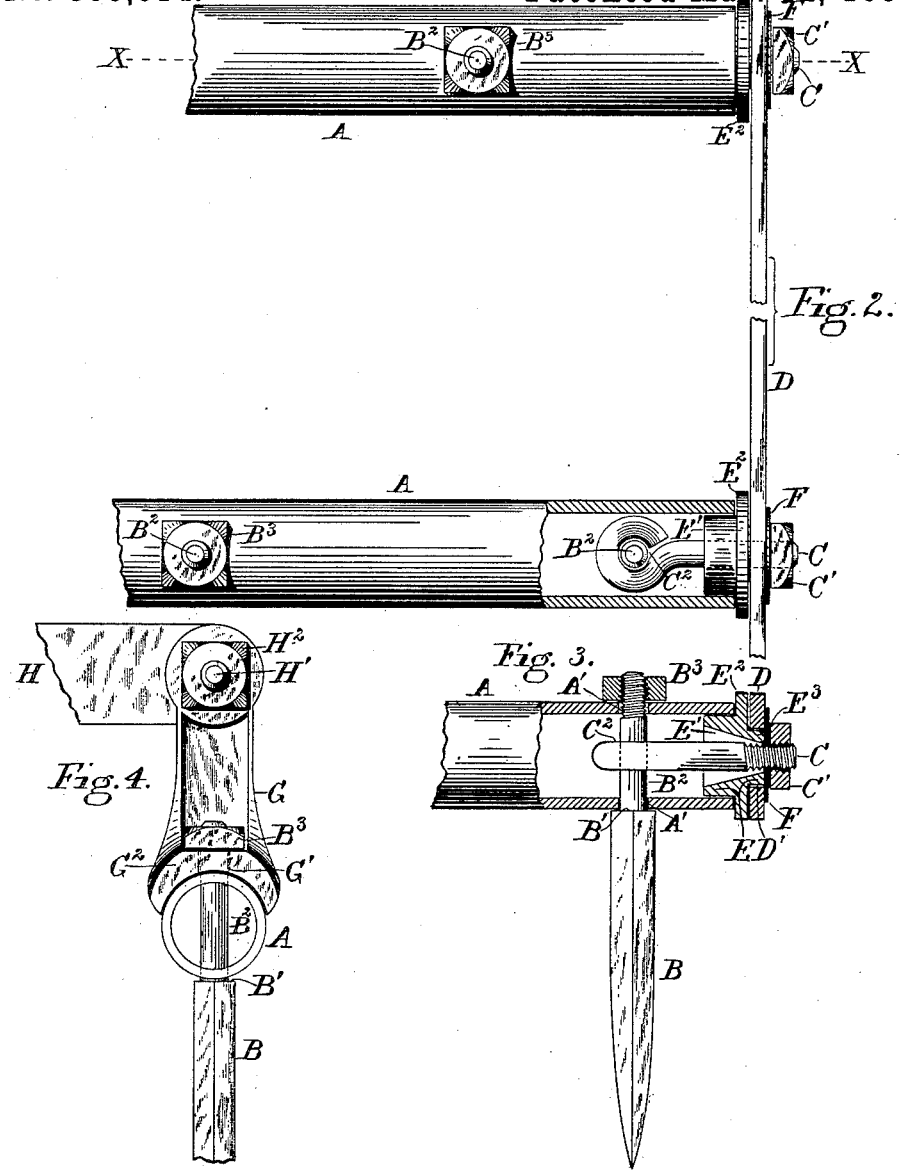

UNITED STATES PATENT OFFICE.

SIMEON B. HENDRICKS, OF ROCKFORD, ILLINOIS, ASSIGNOR TO THE SKANDIA PLOW COMPANY, OF SAME PLACE.

HARROW.

SPECIFICATION forming part of Letters Patent No. 399,614, dated March 12, 1889.

Application filed December 17, 1888. Serial No. 293,896. (No model.)

*To all whom it may concern:*

Be it known that I, SIMEON B. HENDRICKS, a citizen of the United States, residing at Rockford, in the county of Winnebago and State of Illinois, have invented a certain new and useful Improvement in Harrows, of which the following is a specification.

This invention relates to an improved means of securing together the parts of adjustable lever-harrows; and it consists of certain new and useful constructions and combinations of parts hereinafter described, and pointed out in the claims.

Referring to the accompanying drawings, which form a part of this specification, Figure 1 is an isometric view in detail of a harrow composed of two sections embodying my improvements. Fig. 2 is a detailed plan view of two beams and an end cross-beam of the harrow, a portion of one of said beams being broken away to show the manner of connecting the same with an end cross-beam. Fig. 3 is a view of a vertical partial section, through the dotted line X in Fig. 2, of a beam, an end cross-beam, and fastenings for connecting the same together. Fig. 4 is an end view of a harrow-beam and adjusting-standard secured together by means of a harrow-tooth and nut.

Like letters of reference indicate corresponding parts throughout the several views.

A is a harrow-beam, preferably cylindrical and tubular in form, provided with transverse holes A', extending therethrough, for admitting harrow-teeth.

B is a harrow-tooth having a horizontal shoulder, B', thereon, and a cylindrical portion, B², adapted to be inserted through the holes A' in the beams A and threaded to receive a nut, B³.

C is an eyebolt threaded to receive a nut, C', and having the eye C² thereof of proper diameter to admit the cylindrical portion B² of a harrow-tooth, B.

D is an end cross-beam having transverse circular openings D' extending therethrough to admit a part to be described hereinafter.

E is a preferably integral combined double bushing and washer, consisting of the bushing E', of suitable diameter to readily enter and fit inside of the harrow-beam A, the washer E², projecting from the outside of the bushing D' between the end of the beam A and the end cross-beam, D, and the bushing E³, extending through the circular opening D' in the end cross-beam, D.

F is a washer embraced between the nut C' and bushing E³.

G is an adjusting-standard having a vertical hole, G', extending through the foot G² thereof. The standard G is secured to the harrow-beam A by means of a harrow-tooth, B, and the nut B³, thereby saving a bolt and nut for each standard used in constructing the harrow.

H is an adjusting-beam, which is hinge-jointed by means of bolts H' and nuts H² to the adjusting-standards G.

I is a segment-rack secured to the adjusting-beam H, and I' an adjusting-lever secured to one of the harrow-beams A, and also to the adjusting-beam H, both of which parts and their modes of operation are too well known to require description.

The herein-described means of securing harrow-beams together will be found to be very cheap, convenient, and strong.

I claim and desire to secure by Letters Patent—

1. In combination, in a harrow, a tubular harrow-beam provided with transverse holes A', extending therethrough, for admitting harrow-teeth, an end cross-beam having transverse openings D' therein, the combined double bushing and washer E, the bushing E' thereof being inserted into the end of the tubular harrow-beam, the bushing E³ extending through the opening D' in the end cross-beam, and the washer E² embraced between the end of the harrow-beam and an end cross-beam, an eyebolt threaded to receive a nut, having an eye, C², and being inserted through the end cross-beam and combined double bushing and washer E, a harrow-tooth threaded to receive a nut inserted through one of the holes A' in the harrow-beam and the eye C² in the eyebolt, and nuts for securing all of said parts operatively together, substantially as described, and for the purpose specified.

2. In combination, a harrow-beam provided with transverse holes A', extending therethrough, for admitting harrow-teeth, a harrow-tooth having a horizontal shoulder thereon and cylindrical portion $B^2$, adapted to be inserted through the holes $A'$ in said beam and threaded to receive a nut, an adjusting-standard having a vertical hole, $G'$, extending through the foot $G^2$ thereof to admit said tooth therethrough, and a nut, $B^3$, for securing said tooth into and said standard upon said harrow-beam, substantially as set forth.

3. In combination, the harrow-beams A, provided with transverse holes $A'$, extending therethrough, the end cross-beams, D, having transverse openings $D'$ therein, the combined double bushings E, inserted into the ends of the harrow-beams A and through the end cross-beams, D, the washers F, the eyebolts C, the teeth B, inserted through the harrow-beams A and eyes $C^2$ in the eyebolts C, the standards G, the adjusting-beams H, the bolts $H'$, and nuts $B^3$, $C'$, and $H^2$, for securing said parts operatively together, substantially as described, and for the purpose set forth.

SIMEON B. HENDRICKS.

Witnesses:
J. A. LUNDGREN,
L. L. MORRISON.